(12) United States Patent
Veerasamy et al.

(10) Patent No.: US 6,689,476 B2
(45) Date of Patent: Feb. 10, 2004

(54) HYDROPHOBIC COATING INCLUDING OXIDE OF NI AND/OR CR

(75) Inventors: Vijayen S. Veerasamy, Farmington Hills, MI (US); Rudolph Hugo Petrmichl, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 09/891,458

(22) Filed: Jun. 27, 2001

(65) Prior Publication Data

US 2003/0031877 A1 Feb. 13, 2003

(51) Int. Cl.⁷ ................................. B32B 9/00
(52) U.S. Cl. ................. 428/432; 428/433; 428/697; 428/699; 428/701; 428/702; 427/162; 427/166; 427/419.2
(58) Field of Search ................. 428/432, 433, 428/697, 699, 701, 702; 427/162, 166, 419.2

(56) References Cited

U.S. PATENT DOCUMENTS

| | | |
|---|---|---|
| 4,603,805 A | 8/1986 | Rogers |
| 4,953,922 A * | 9/1990 | Granqvist ................. 350/1.7 |
| 5,030,478 A * | 7/1991 | Lin et al. ................. 427/54.1 |
| 5,229,194 A | 7/1993 | Lingle et al. |
| 5,264,099 A | 11/1993 | Szczyrbowski et al. |
| 5,376,455 A | 12/1994 | Hartig et al. |
| 5,378,527 A | 1/1995 | Nakanishi et al. |
| 5,436,047 A | 7/1995 | Howard et al. |
| 5,514,476 A | 5/1996 | Hartig et al. |
| 5,547,768 A | 8/1996 | Topolski et al. |
| 5,563,734 A | 10/1996 | Wolfe et al. |
| 5,798,134 A | 8/1998 | Sato et al. |
| 5,876,854 A | 3/1999 | Kawazu et al. |
| 5,909,314 A * | 6/1999 | Oka et al. ................. 359/582 |
| 6,090,489 A * | 7/2000 | Hayakawa et al. ......... 428/409 |
| 6,156,389 A * | 12/2000 | Brown et al. ............. 427/393.4 |
| 6,235,833 B1 * | 5/2001 | Akamatsu ................. 524/588 |
| 6,335,086 B1 * | 1/2002 | Veerasamy ................. 428/217 |
| 6,338,901 B1 * | 1/2002 | Veerasamy ................. 428/408 |

FOREIGN PATENT DOCUMENTS

| | | | |
|---|---|---|---|
| FR | 2 792 003 | 10/2000 | |
| JP | 2-258250 | * 10/1990 | ............. B32B/9/00 |
| JP | 06-219785 | 8/1994 | |

OTHER PUBLICATIONS

Translation of JP 02–258250.*
"Surface Science of Metal Oxides", Victor Heinrich & P.A. Cox, 1994, pp. 14–43.
PCT Search Report dated Nov. 19, 2002.

* cited by examiner

Primary Examiner—Deborah Jones
Assistant Examiner—Vivek Koppikar
(74) Attorney, Agent, or Firm—Nixon & Vanderhye P.C.

(57) ABSTRACT

A hydrophobic coating is provided. The coating has a high contact angle $\theta$ which does not significantly decrease or degrade upon lengthy exposure to ultraviolet (UV) radiation. In certain embodiments, the coating has a contact angle $\theta$ of at least 70 degrees both before and after significant exposure to UV radiation.

19 Claims, 8 Drawing Sheets

XPS (Example 1)

| Relative Depth Steps | Cr Oxide % | Cr/CrSix % | Ni oxide % | Ni metal % | NiSix % |
|---|---|---|---|---|---|
| 0 | 5.47 | 0 | 25.42 | 0 | 0.26 |
| 1 | 9.15 | 0.02 | 40.01 | 2.09 | 0 |
| 2 | 9.61 | 0.15 | 33 | 13.23 | 0 |
| 3 | 10.46 | 0.16 | 29.91 | 16.52 | 0 |
| 4 | 10.45 | 0.24 | 27.78 | 16.66 | 0 |
| 5 | 10.96 | 0.23 | 27.29 | 17.97 | 0 |
| 6 | 11.15 | 0.32 | 26.16 | 17.86 | 0 |
| 7 | 10.24 | 0.36 | 18.61 | 23.5 | 0 |
| 8 | 5.33 | 1.62 | 0 | 22.96 | 0 |
| 9 | 0.73 | 3.34 | 0 | 5.36 | 11.47 |
| 10 | 0.09 | 4.09 | 0.15 | 1.96 | 15.78 |
| 11 | 0.36 | 3.14 | 0.43 | 0.48 | 12.44 |
| 12 | 0.13 | 2.38 | 0.3 | 0.1 | 8.77 |
| 13 | 0 | 1.49 | 0 | 0 | 5.7 |
| 14 | 0 | 1.01 | 0 | 0.08 | 3.32 |
| 15 | 0 | 0.68 | 0.03 | 0.17 | 1.73 |
| 16 | 0.13 | 0.29 | 0 | 0.16 | 0.87 |
| 17 | 0 | 0.13 | 0 | 0.22 | 0.46 |
| 18 | 0 | 0.03 | 0 | 0 | 0.32 |
| 19 | 0 | 0.02 | 0.02 | 0.13 | 0.14 |
| 20 | 0 | 0 | 0.02 | 0.03 | 0.09 |

FIG. 6

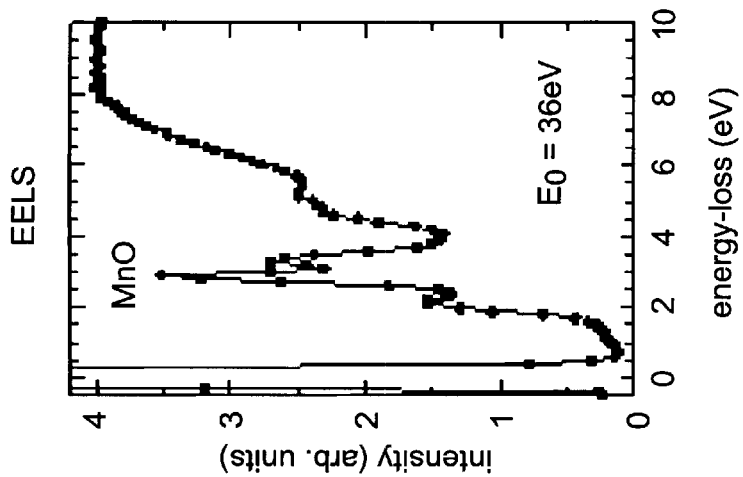
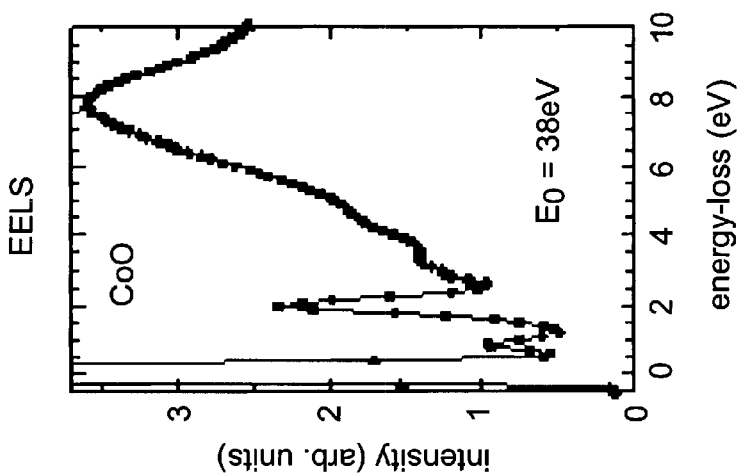
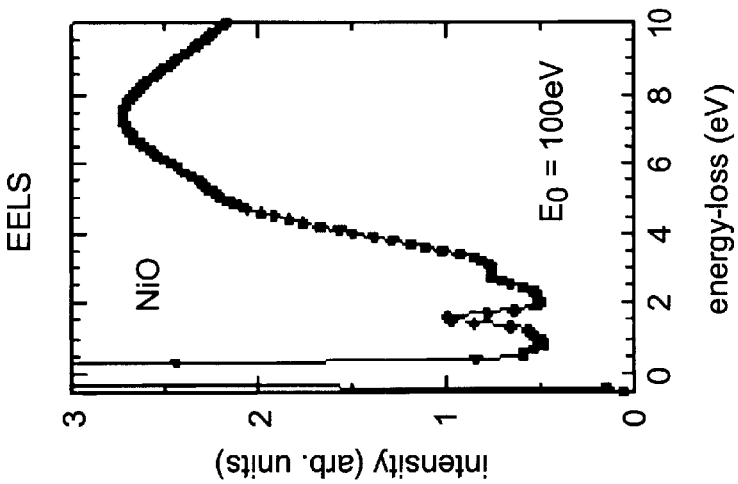
FIG. 7A
FIG. 7B
FIG. 7C

XPS (Example 5)

| Time (min) | Depth (Å) | O1s | Na1s | Si2p | Ca2p | Cr2p3 | Ni2p3 |
|---|---|---|---|---|---|---|---|
| 0 | 0 | 72.1 | 0.0 | 1.4 | 0.9 | 8.8 | 16.8 |
| 0.15 | 15 | 48.1 | 0.1 | 0.0 | 0.3 | 11.0 | 40.5 |
| 0.3 | 30 | 44.9 | 0.0 | 0.0 | 0.2 | 11.3 | 43.7 |
| 0.45 | 45 | 43.7 | 0.0 | 0.0 | 0.2 | 11.6 | 44.5 |
| 0.6 | 60 | 43.3 | 0.3 | 0.6 | 0.1 | 11.3 | 44.5 |
| 0.75 | 75 | 44.0 | 0.0 | 0.0 | 0.0 | 10.6 | 45.5 |
| 0.9 | 90 | 44.7 | 0.0 | 0.0 | 0.2 | 11.0 | 44.1 |
| 1.05 | 105 | 45.6 | 0.0 | 1.7 | 0.0 | 10.2 | 42.5 |
| 1.2 | 120 | 46.4 | 0.3 | 2.6 | 0.0 | 9.9 | 40.8 |
| 1.35 | 135 | 50.8 | 0.7 | 7.7 | 0.7 | 8.4 | 31.8 |
| 1.5 | 150 | 57.2 | 1.5 | 15.7 | 1.1 | 5.9 | 18.7 |
| 1.65 | 165 | 60.2 | 2.2 | 19.6 | 1.6 | 4.1 | 12.4 |
| 1.8 | 180 | 61.9 | 2.4 | 21.9 | 2.3 | 3.3 | 8.2 |
| 1.95 | 195 | 63.9 | 2.8 | 23.2 | 2.4 | 2.0 | 5.6 |
| 2.1 | 210 | 65.6 | 2.8 | 23.7 | 2.7 | 1.3 | 4.0 |
| 2.25 | 225 | 65.4 | 2.6 | 24.6 | 3.1 | 1.2 | 3.0 |
| 2.4 | 240 | 65.9 | 2.6 | 25.3 | 3.2 | 1.2 | 1.8 |
| 2.55 | 255 | 66.2 | 3.2 | 25.5 | 3.5 | 0.6 | 1.1 |
| 2.7 | 270 | 66.0 | 3.0 | 25.3 | 3.5 | 1.1 | 1.1 |

FIG. 9

HYDROPHOBIC COATING INCLUDING OXIDE OF NI AND/OR CR

This invention relates to a hydrophobic coating to be used in the context of coated articles. More particularly, this invention relates to a hydrophobic coating comprising a layer having a contact angle(s) θ which does not significantly decrease upon exposure to ultraviolet (UV) radiation. In certain example embodiments, the layer may be of or include $NiCrO_x$, or any other suitable material.

BACKGROUND OF THE INVENTION

Hydrophobic coatings are known in the art, and are typically characterized by high contact angles θ. Contact angles, in general, are discussed for example in U.S. Ser. Nos. 09/442,805 filed Nov. 18, 1999 (now U.S. Pat. No. 6,338,901), and 09/583,862 filed Jun. 1, 2000 (now U.S. Pat. No. 6,335,086), both of which are hereby incorporated herein by reference. Contact angle θ is explained in the context of FIGS. 1 and 2.

The initial contact angle θ of a conventional glass substrate 1 with sessile water drop 3 thereon is typically from about 22–24 degrees, although it may dip as low as 17 or so degrees in some circumstances, as illustrated in FIG. 1. Thus, conventional glass substrates are not particularly hydrophobic in nature. The provision of a hydrophobic coating or layer system 5 on substrate 1 causes the contact angle θ to increase to the angles discussed herein, as shown in FIG. 2. As shown in FIG. 2, hydrophobic coatings can have initial contact angles θ of above 90 degrees for water repelling purposes. An "initial" contact angle θ means prior to exposure to environmental conditions such as sun, rain, abrasions, ultraviolet radiation, humidity, etc.

For example, U.S. Pat. No. 5,378,527 discloses a diamond-like carbon (DLC) coating having a contact angle of 90 degrees in certain examples, and 120 degrees in other examples. Unfortunately, it has been found that initial contact angles θ of DLC coatings drop dramatically upon prolonged exposure to ultraviolet (UV) radiation in an ambient atmosphere including sun, rain and the like. This UV stability problem can in some instances result in contact angle θ dropping from an initial value of 80 degrees or higher to a post-UV value of less than 20 degrees.

In view of the above, those skilled in the art will appreciate that there exists a need in the art for a UV stable hydrophobic coating which does not experience a significant loss/decrease in contact angle θ value upon prolonged exposure (e.g., 100–250 hours) to UV radiation. Other needs will also become apparent to those skilled in the art upon review of the instant document.

BRIEF SUMMARY OF THE INVENTION

An object of this invention is to provide a hydrophobic coating that has a rather high contact angle θ of at least about 70 degrees, both before and after exposure to ultraviolet (UV) radiation (e.g., about 100–250 hours of UV exposure). In other words, an object of this invention is to provide a hydrophobic coating that is UV stable (i.e., not subject to significant contact angle θ degradation upon UV exposure).

Another object of this invention is to provide hydrophobic coating that is transmissive of at least 60% of visible light, more preferably at least 70% of visible light, and most preferably at least 75% of visible light.

Another object of this invention is to provide a hydrophobic coating that is durable enough to be used in the context of vehicle windows, architectural windows, and/or the like.

Another object of this invention is to provide a hydrophobic coating including at least one $NiCrO_x$ inclusive layer.

Another object of this invention is to fulfill one or more of the above listed objects and/or needs.

BRIEF DESCRIPTION OF THE DRAWINGS

FIG. 6 is an x-ray photoelectron spectroscopy (XPS) graph showing data from FIG. 5 in a different form, illustrating the atomic % of $Cr_xO_y$ (Cr oxide), $Cr/CrSi_x$ (Cr metal and chromium silicide), NiO (nickel oxide), Ni (Ni metal), and $NiSi_x$ (nickel silicide) throughout a portion of the thickness of the coated article of Example 1.

FIG. 7 illustrates three EELS (Electron Energy Loss Spectroscopy) plots for NiO, CoO, and MnO, respectively.

FIG. 9 is an x-ray photoelectron spectroscopy (XPS) graph showing data from FIG. 8 in a different form, illustrating the atomic % of O, Na, Si, Ca, Cr and Ni throughout a portion of the thickness of the coated article of Example 5.

DETAILED DESCRIPTION OF CERTAIN EXAMPLE EMBODIMENT(S) OF THE INVENTION

Figure 1:
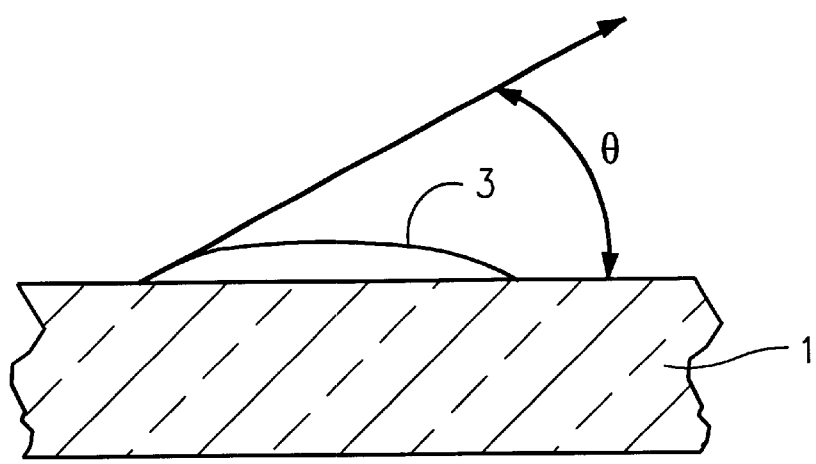
FIG. 1 is a side cross sectional view illustrating the low contact angle θ of a sessile drop of water on a glass substrate.
Figure 2:
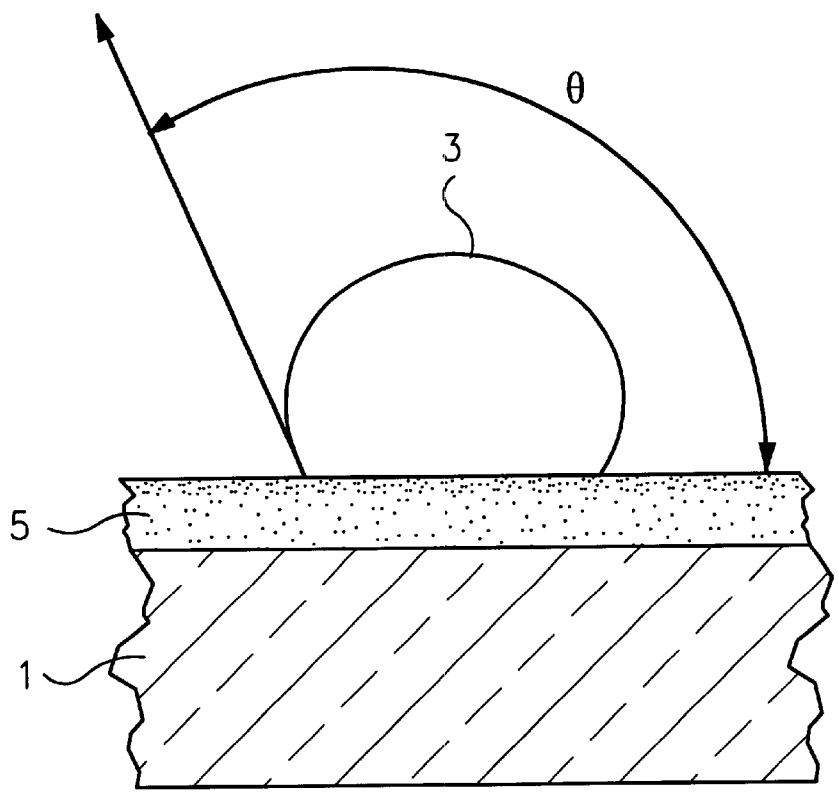
FIG. 2 is a side cross sectional view illustrating the high contact angle θ of a sessile drop of water on a glass substrate having a hydrophobic coating thereon.

Referring now more particularly to the accompanying drawings in which like reference numerals indicate like parts throughout the several views. The below-discussed example embodiments are provided for purposes of example only, and are not intended to be limiting upon the invention.

Figure 3:
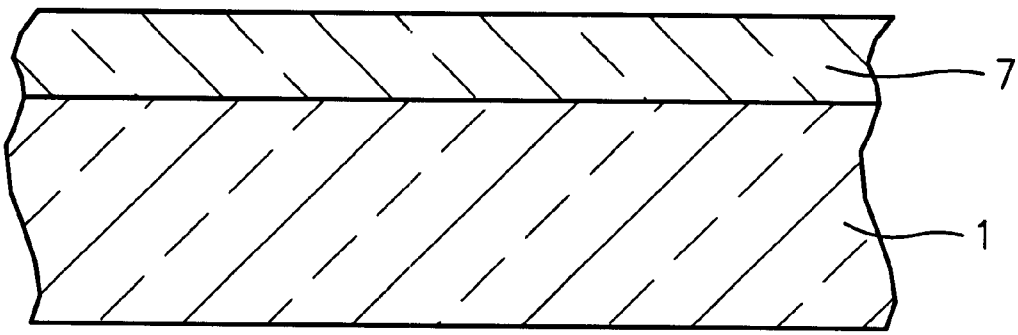
FIG. 3 is a side cross sectional view of a coated article having a hydrophobic coating (or layer system) according to an embodiment of this invention.

FIG. 3 is a side cross sectional view of a portion of a coated article according to an embodiment of this invention, The coated article of FIG. 3 includes a hydrophobic coating (or layer system) 7 provided on substrate 1. Substrate 1 may be of or include glass (e.g., soda-lime-silica glass, pyrex, or the like), plastic, ceramic, silicon, or any other suitable material. When substrate 1 is glass, it may be of any suitable color including clear, green, grey, blue-green, bronze, or the like. Coating 7 may include one or more layers. In FIG. 3 and elsewhere herein, coating 7 is considered to be "on" and "supported by" substrate 1, regardless of whether additional layer(s) are provided between the substrate 1 and the coating 7.

In the embodiment illustrated in FIG. 3, the hydrophobic coating includes a single layer 7. Layer 7 may be of or include $NiCrO_x$ in preferred embodiments of this invention. However, in other embodiments of this invention hydrophobic layer 7 may be of or include nickel oxide (NiO), cobalt oxide (CoO), iron oxide (FeO), and/or manganese oxide (MnO). While layer 7 may be of any suitable thickness in different embodiments of this invention, layer 7 may be from 10 to 1,000 angstroms (Å) thick in certain embodiments, more preferably from about 10 to 500 Å thick, even more preferably from 10 to 200 Å thick, and most preferably from 10 to 75 Å thick.

In embodiments where hydrophobic layer 7 is of or includes $NiCrO_x$, it will be understood from the instant document that the $NiCrO_x$ may include nickel oxide (NiO), chromium oxide ($Cr_xO_y$ wherein x and y may be any suitable value including but not limited to x=2 and y=3), metallic Ni, and/or metallic Cr. Small amounts of other materials including but not limited to nickel silicide ($NiSi_x$), chromium silicide ($CrSi_x$), silicon, and/or carbon may also be included in the $NiCrO_x$ inclusive layer 7. In certain embodiments of this invention, hydrophobic layer 7 and/or the coated article overall may have a visible transmission of at least 60% of visible light, more preferably at least 70% of visible light, and most preferably at least 75% of visible light (e.g., this is advantageous in applications such a vehicle windshields and other vehicle windows).

Surprisingly, it has been found that when $NiCrO_x$ inclusive layer 7 is significantly oxidized, and when provided as the outmost layer of a single or multi-layer coating, hydrophobicity (i.e., high contact angles θ) result. In certain embodiments of this invention, $NiCrO_x$ inclusive layer 7 has an "initial" contact angle θ of at least about 70 degrees, more preferably of at least about 80 degrees.

Even more surprising is the finding that the contact angle θ of $NiCrO_x$ inclusive layer 7 is fairly stable upon significant exposure (e.g., 100–250 hours) to ultraviolet (UV) radiation. In particular, in certain embodiments of this invention $NiCrO_x$ inclusive layer 7 has a contact angle θ of at least about 60 degrees, more preferably of at least about 70 degrees, and most preferably of at least about 80 degrees, after 100 hours (more preferably after 150 hours, and even more preferably after 200 hours) of UV exposure. In some example embodiments of this invention, the contact angle θ of layer 7 may increase (as opposed to decrease like the prior art) upon exposure to the aforesaid UV radiation.

Thus, it can be seen that the use of $NiCrO_x$ inclusive layer 7 provides for a hydrophobic coating having a contact angle θ that is fairly stable upon exposure to UV radiation. In certain embodiments of this invention, upon exposure to UV radiation for 100 hours (more preferably after 150 hours, and even more preferably after 200 hours), the contact angle θ of layer 7 does not drop or decrease by more than 15%, more preferably does not drop or decrease by more than 10%, and most preferably does not drop or decrease by more than 7%.

Figure 4:
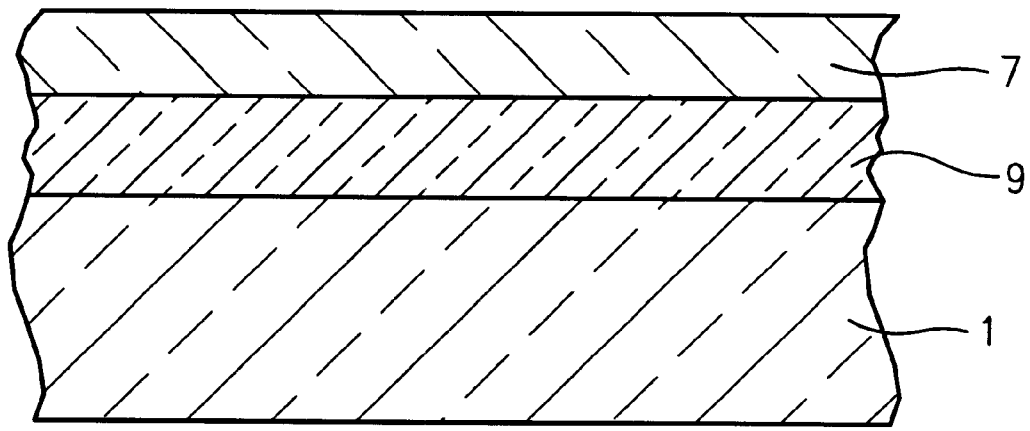
FIG. 4 is a side cross sectional view of a coated article having a hydrophobic coating (or layer system) according to another embodiment of this invention.

FIG. 4 illustrates another embodiment of this invention, wherein hydrophobic layer 7 is the same as in the FIG. 3 embodiment discussed above. However, another layer(s) 9 is provided between substrate 1 and layer 7 in the FIG. 4 embodiment.

Still referring to FIG. 4, according to certain embodiments of this invention, when of glass, substrate 1 has an index of refraction "n" of about 1.5. $NiCrO_x$ inclusive layer 7 preferably has an index of refraction "n" (at 550 nm) of from 2.00 to 2.80, more preferably from 2.20 to 2.60, and most preferably from 2.20 to 2.50. In a similar manner, $NiCrO_x$ inclusive layer 7 may have a "k" value (at 550 nm) of from 0.18 to 0.9, more preferably from 0.20 to 0.60 in certain embodiments of this invention. The relatively large index of refraction "n" mismatch between layer 7 and substrate 1 in some embodiments may lead to high reflectance. The reflectance of the resulting coated article can be reduced by providing at least one anti-reflection layer(s) 9 between the substrate 1 and hydrophobic layer 7 as shown in FIG. 4. For example and without limitation, layer 9 may be a dielectric in certain embodiments of this invention and may be of or include tin oxide, silicon oxide, zinc oxide, silicon nitride, alumina, silicon oxynitride, or the like. Layer 9, in certain example embodiments, may have an index of refraction "n" of from 1.6 to 2.1, more preferably from 1.6 to 1.95. Moreover, while layer 9 may be of any suitable thickness, it may be from 50–1,000 angstroms (Å) thick in certain example embodiments of this invention.

EXAMPLES 1–5

Five (5) examples of the FIG. 3 embodiment of this invention were made and analyzed as set forth below. In each of Examples 1–5, a single layer 7 of $NiCrO_x$ was sputter coated directly onto a substrate 1. In Examples 1–5, substrate 1 was Si inclusive soda-lime-silica glass about 3 mm thick. Conventional sputter coating devices were used in these Examples, with sputtering being performed in a vacuum chamber/zone. All NiCr sputtering targets were about 80:20 Ni:Cr. Planar magnetron racetrack shaped NiCr targets were used. The line speed was about 2.5 m/min. for all Examples.

TABLE 1

Example Sputtering Data for Depositing Hydrophobic $NiCrO_x$ Layer 7

| Example No. | Target(s) | Power (kW) | Ar Gas Flow (sccm) | $O_2$ Gas Flow (sccm) |
|---|---|---|---|---|
| 1 | Ni:Cr | 4.25 | 200 | 30 |
| 2 | Ni:Cr | 7.9 | 250 | 40 |
| 3 | Ni:Cr | 4.5 | 200 | 20 |
| 4 | Ni:Cr | 4.3 | 150 | 28 |
| 5 | Ni:Cr | 5.5 | 250 | 55 |

As can be seen in the Table above, various degrees of oxidation were provided for $NiCrO_x$ inclusive layer 7 in the different Examples 1–5. For example, the ratio of argon to oxygen gas flow in Example 5 was 250:55 (i.e., 4.54) in Example, and was a mere 200:20 (i.e., 10.0) in Example 3. The ratio of inert gas (e.g., Ar) flow to oxygen flow in the sputter zone for layer 7 may be from 0.5 to 20.0 in certain embodiments of this invention, more preferably from 1.0 to 15.0, and most preferably from 3.0 to 10.0. It will also be recognized that while layer 7 (and/or layer 9) may be deposited via sputtering in certain embodiments of this invention, other deposition methods (e.g., ion beam deposition) may also/instead be used.

Initial contact angle θ was then measured for each Example 1–5, using an FTA contact angle machine. Thereafter, each of the Example coated articles was placed into a QUV exposure chamber for at least two days of UV radiation exposure. The QUV machine was set for cycles of two (2) hours heat (about 60 degrees C.) and humidity followed by two (2) hours of UV light exposure (the UV light/radiation was from UVA-340 fluorescent bulbs that match the UV spectrum of sunlight as well). The total cumulative time of UV exposure was noted, as can be seen below. After being removed from the exposure chamber, each Example coated article was rinsed with distilled water, rubbed with clean paper towel, rinsed, and blown dry so as to clean the same prior to post-UV contact angle θ measurement(s).

The post-UV contact angles (CAs) θ for each of these Examples are set forth below in Table 2. In Table 2, "initial" contact angle θ means contact angle before UV exposure (in units of degrees); total UV means number of UV hours that the coated article was exposed to UV radiation, post-UV CA means contact angle θ after the UV exposure (in units of degrees); $T_{vis}$ means the visible transmission % (Ill. A, 10 degree observer) of the coated article after UV exposure; and thickness means the thickness of the $NiCrO_x$ inclusive layer 7 in angstroms. Examples 1 and 3–5 were not heat treated after sputtering of the coating, however Example 2 was heat treated for about five minutes at about 625 degrees C. before the initial contact angle measurement was taken. Examples 1–5 were also found to be scratch resistant and durable. As for mechanical durability, it has been found that in certain example embodiments of this invention that the coating does not wear away even after one million windshield wiper cycles over the same.

TABLE 2

CONTACT ANGLES θ PRE/POST UV EXPOSURE

| Example | Initial CA θ | Total UV (hours) | Post-UV CA θ | $T_{vis}$ | Thickness |
|---|---|---|---|---|---|
| 1 | 77 deg. | 190+ | 82 deg. | 81% | ≈100Å |
| 2 | 84 deg. | 115+ | 79 deg. | 77% | ≈200Å |
| 3 | 90 deg. | 32+ | 84 deg. | 52% | ≈400Å |
| 4 | 87 deg. | 32+ | 85 deg. | 75% | ≈200Å |
| 5 | 88.7 deg. | 32+ | 88 deg. | 84% | ≈80 |

Table 3 below lists the change in contact angle (CA) θ resulting from the UV exposure listed in Table 2 (this information can be obtained from Table 2, but is set forth in a simpler manner in Table 3 below). Change in CA θ is represented by ΔCA θ in Table 3. Table 3 also lists indices "n" (i.e., index of refraction) and "k" for certain of the Examples (at 550 nm), and certain color values (note: L*, a*, and b* are Ill. D65 10 degree observer in Table 3, while visible transmission $T_{vis}$ above in Table 2 was measured in terms of Ill. A 10 degree observer). The "t" subscripts in Table 3 mean transmissive (e.g., $a^*_t$ means a* transmissive), while the "R" subscripts in Table 3 mean film side reflective Ill. D65 10 degree observer. It is noted that $Y_R$ stands for film side reflectance as will be appreciated by those skilled in the art.

TABLE 3

INDICES, COLOR & CHANGE IN CA θ DUE TO UV

| Example | "n" | "k" | ΔCA θ | $L^*_t$ | $a^*_t$ | $b^*_t$ | $Y_R$ | $L^*_R$ | $a^*_R$ | $b^*_R$ |
|---|---|---|---|---|---|---|---|---|---|---|
| 1 | 2.4 | 0.27 | +5 deg. | 91.8 | −0.3 | 3.2 | 11.4 | 40.2 | −0.5 | −4.5 |
| 2 | 2.3 | 0.21 | −5 deg. | 90.0 | −0.5 | 7.7 | 19.7 | 51.4 | −1.4 | −10.6 |
| 3 | n/a | n/a | −6 deg. | n/a | n/a | n/a | n/a | n/a | n/a | n/a |
| 4 | n/a | n/a | −2 deg. | n/a | n/a | n/a | n/a | n/a | n/a | n/a |
| 5 | n/a | n/a | −0.7 deg. | n/a | n/a | n/a | n/a | n/a | n/a/ | n/a |

As can be seen in Table 3 above, the contact angle θ for Example 1 went up upon lengthy UV exposure, while the contact angles θ for Examples 2–5 went down (but only slightly) upon length UV exposure. In all five cases, the contact angles θ exhibited stability much better than the prior art discussed above upon lengthy UV exposure. Moreover, the indices "n" and "k" are within the ranges discussed above, as are the % changes in contact angle due to the UV exposure. For example and without limitation, in certain embodiments of this invention, transmissive a* values are from about +2 to −6 for layer 7, more preferably from about +1 to −2; while transmissive b* values are from about 0 to +12, more preferably from about +1 to +10; and transmissive L* values are from about 80 to 100. Film side reflective a* values are from about +2 to −6 for layer 7, more preferably from about +1 to −3; while film side reflective b* values are from about 0 to −14, more preferably from about −1 to −11; and film side reflective L* values are from about 30 to 60.

Figure 5:
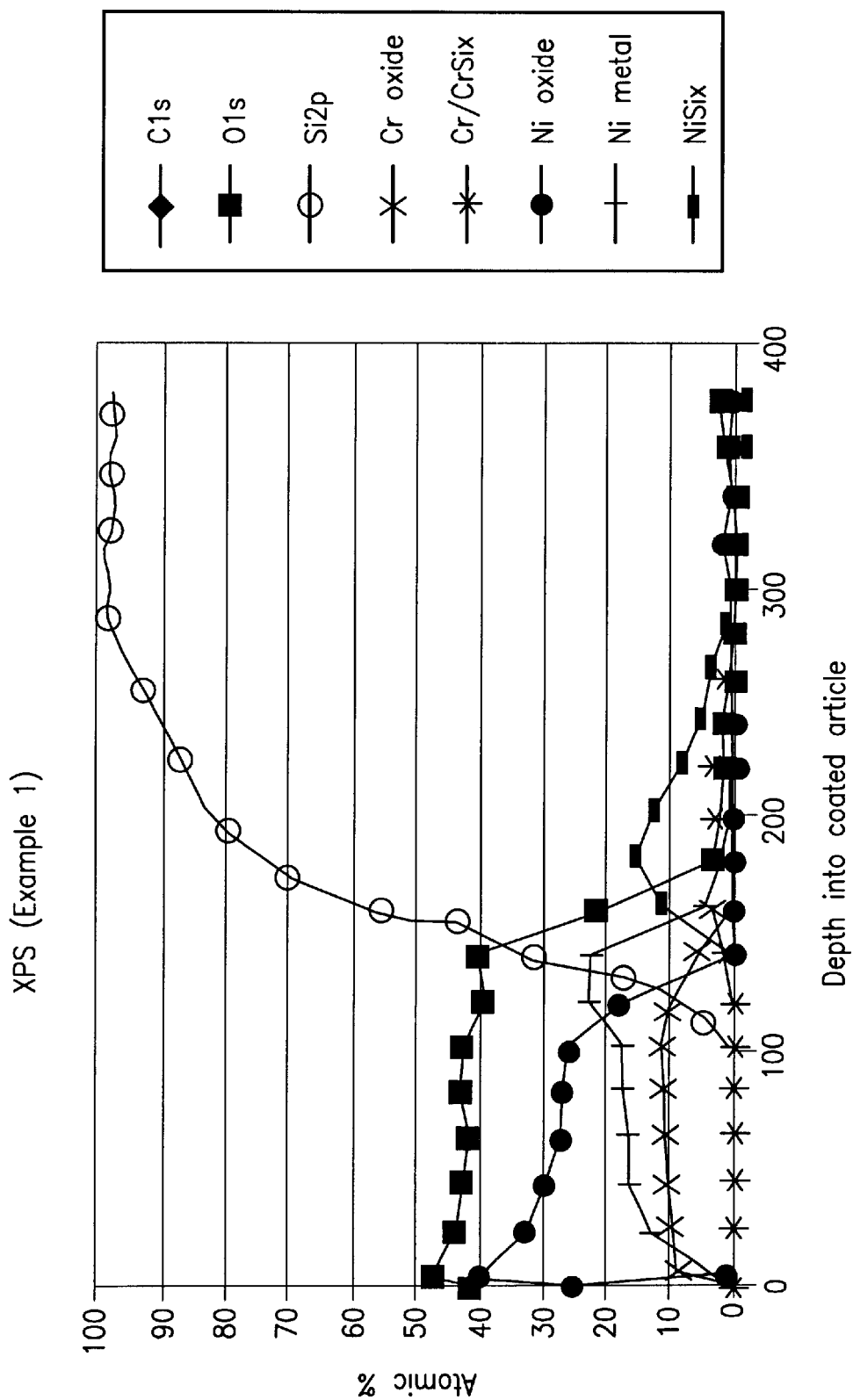
FIG. 5 is an x-ray photoelectron spectroscopy (XPS) graph (atomic % vs. depth into coated article) illustrating the atomic % of components C, O, Si, $Cr_xO_y$ (chromium oxide), $Cr/CrSi_x$ (Cr metal and chromium silicide), NiO (nickel oxide), Ni (Ni metal), and $NiSi_x$ (nickel silicide) throughout the thickness of a portion of the coated article of Example 1, where the "depth" axis refers to the depth into the coating and/or Si wafer substrate from the exterior surface thereof as compared to the depth into a conventional $SiO_2$ layer that would have been achieved over the same period of time.

FIG. 5 is an X-ray photoelectron spectroscopy (XPS) graph (atomic % vs. depth into coated article) illustrating the atomic % of components C, O, Si, $Cr_xO_y$ (chromium oxide), $Cr/CrSi_x$ (Cr metal and chromium silicide), NiO (nickel oxide), Ni (Ni metal), and $NiSi_x$ (nickel silicide) throughout the thickness of a portion of the coated article of Example 1, where the $NiCrO_x$ inclusive layer 7 was sputtered onto a Si inclusive glass substrate. In FIG. 5, the interface between layer 7 and the underlying Si-inclusive glass substrate 1 can be seen where the Si increases (i.e., around depth 100), where Si2p is the 2p orbital. XPS provides the compositional make-up of layer 7, as well as chemical bonding therein. In this regard, FIG. 5 shows that the outer surface (i.e., the outer 5–20 Å) of layer 7 (near 0 depth) includes primarily nickel oxide and chromium oxide, while the majority of the metallic nickel (Ni) is buried below the surface of the layer 7. The total atomic concentration of oxygen (O) is about 45% in layer 7, as shown in FIG. 5. It can be seen that nickel silicide (NiSix) forms in the glass substrate 1 below its surface (it is believed that this is due to heating).

FIG. 6 is a chart/graph illustrating the Ni and Cr information from FIG. 5 in a different form (i.e., for the Ex. 1 coated article). Again, it can be seen from FIG. 6 that the outer surface (i.e., depth steps 0–3) of layer 7 (near 0 depth) includes primarily nickel oxide and chromium oxide, while the majority of the metallic nickel (Ni) is buried below the surface in layer 7. It can also be seen from FIGS. 5–6 that layer 7 includes more nickel oxide than Ni metal, and also includes more nickel oxide than chromium oxide. However, much of the lower half of layer 7 includes more Ni metal than chromium oxide. Thus, it will be appreciated by those skilled in the art that in certain preferred embodiments of this invention at least about 40% of the Ni in layer 7 is oxidized, more preferably at least about 50%, and most preferably at least about 60%. Additionally, in certain preferred embodiments at least about 50% of the Cr in layer 7 is oxidized, more preferably at least about 60%, and most preferably at least about 75% of the Cr in layer 7 is oxided. Moreover, in certain preferred embodiments of this invention, the at least about 20% (more preferably at least about 30%, even more preferably at least about 40%, and most preferably at least about 50%) of the outmost 20 Å thickness of layer 7 is nickel oxide (NiO).

Figure 8:
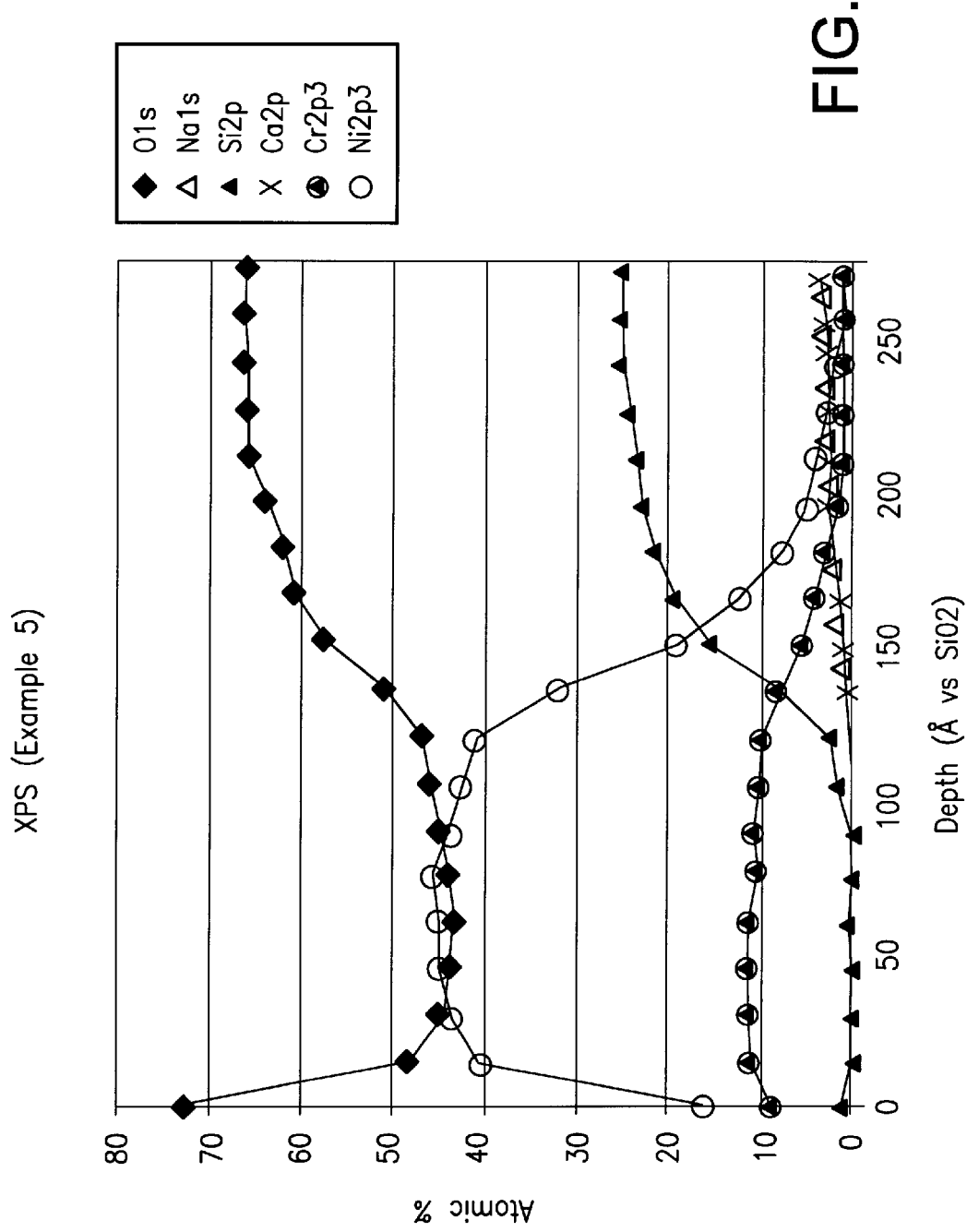
FIG. 8 is an x-ray photoelectron spectroscopy (XPS) graph (atomic % vs. depth into coated article) illustrating the atomic % of components O, Na, Si, Ca, Cr, and Ni throughout the thickness of a portion of the coated article (i.e., hydrophobic coating on a glass substrate) of Example 5, where the "depth" axis refers to the depth into the coating and/or substrate from the exterior surface thereof as compared to the depth into a conventional $SiO_2$ layer that would have been achieved over the same period of time.

In a similar manner, FIG. 8 is an XPS plot illustrating elements in layer 7 and the upper portion of the substrate 1 in Example 5. Again, it can be seen that Ni and O are the primary elements at the outer surface of layer 7 and contribute to its high contact angle and/or UV stability. FIG. 9 is a graph illustrating the information of FIG. 8 in a different form. It can be seen that the interface between layer 7 and substrate 1 occurs around depth 125 Å in FIG. 8 (where Si begins increasing) and around step 1.05 to 1.5 in FIG. 9 (again, where Si begins increasing).

Based upon x-ray diffraction (XRD) studies, it has been found that $NiCrO_x$ inclusive layers 7 according to different embodiments of this invention show a broad peak reminiscent of nanocrystalline to amorphous. However, heat strengthening (e.g. heating such as thermal tempering using temperatures of at least about 580 degrees C. for 1–12 minutes) has been found to enhance the crystallinity of layer 7. Peak identifications have showed the presence in $NiCrO_x$ layer 7 of $NiO:Cr_2O_3$ in non-heat-treated samples, and nichromite spinel ($NiCr_2O_4$) in heat strengthened (e.g., thermally tempered) samples. Using Bragg's law the lattice parameters "d" of the polycrystalline were determined from the angular positions α of the peak signals. The respective nanocrystal grain size "b" was calculated from the FWHW β of a Gauss fit by the equation: $b=K^*\lambda/\beta.\cos\alpha$, where K denotes the Scherrer constant (K=0.94 for FCC lattices) and the wavelength of the x-ray radiation (1.5418 A). The results are summarized in Table 4 below:

TABLE 4

GRAIN SIZE AND PHASE

| d-spacing(A) | Orientation | b-grains size (dia)(Å) | Phase |
|---|---|---|---|
| 1.471 | (100) | 70 | $NiCr_2O_4$ |
| 2.079 | ? | 32 | $NiCr_2O_4$ |
| 2.409 | (111) | 70 | $NiCr_2O_4$ |
| 1.421 | (100) | 100 | NiO |

Figure 10:
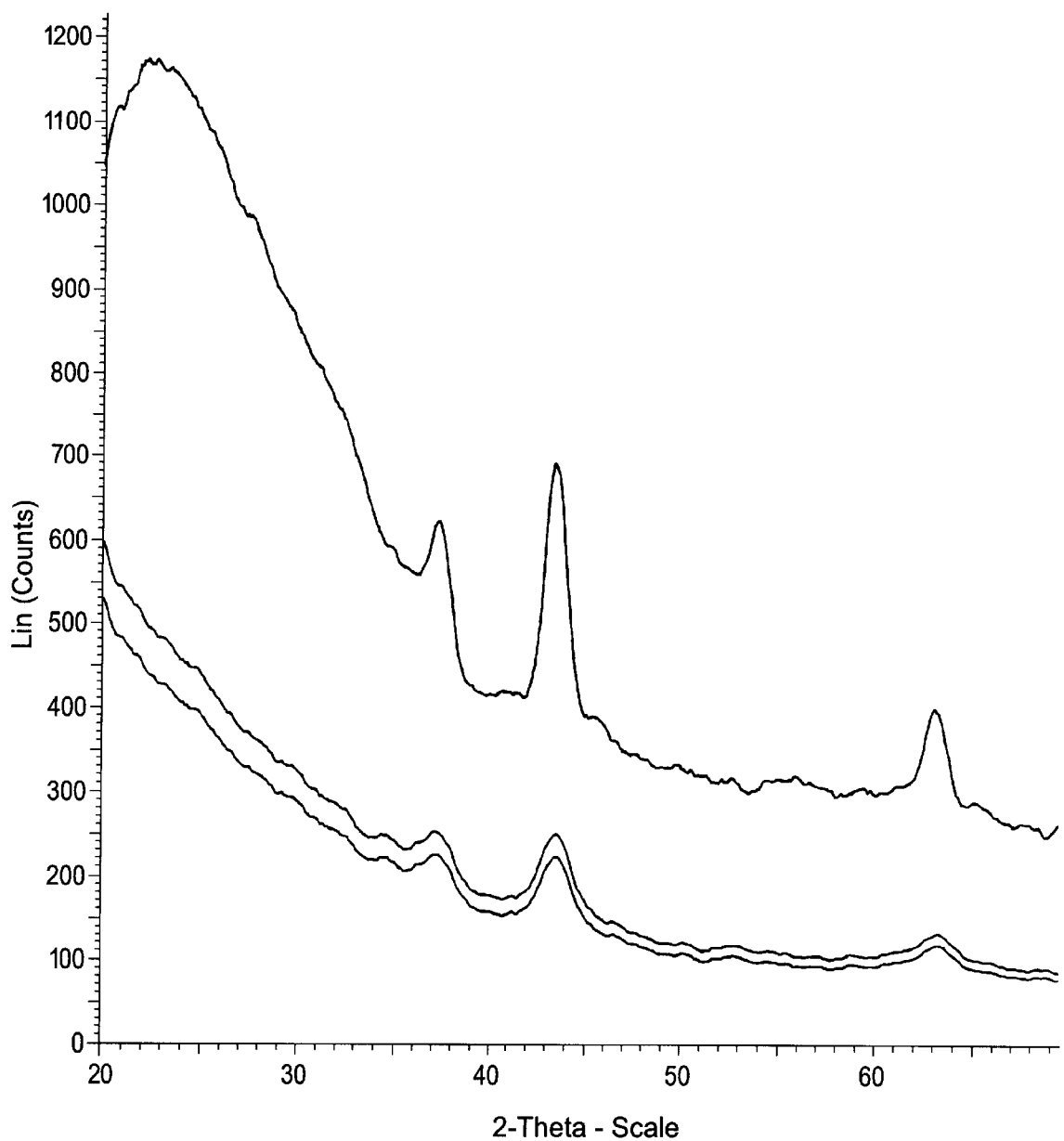
FIG. 10 is an XRD (X-Ray Diffraction) plot/graph of certain $NiCrO_x$ coatings.

FIG. 10 is an XRD graph of three different $NiCrO_x$ coatings that were sputtered onto a substrate, where each plot on the graph is for a different sputtering process that was used. X-rays shot onto the film/coating surface are diffracted by crystals in the film/coating to get a series of peaks/valleys, etc. as shown in FIG. 10. The incident angle of the x-rays was fixed at about 0.5 degrees, and the detector was scanned over the 2-theta angles relative to incident (e.g., a Bruker AXS x-ray diffraction spectrometer could be used). It is noted that Lin (counts) means intensity of diffracted x-ray(s). The three coatings shown in FIG. 10 were sputtered in the same manner, except that for the uppermost plot oxygen gas flow was 30 sccm, Ar gas flow 200 sccm, and power was 8.5 kW/m. The lower two curves are not quite as good as the top plot, and were done at lower power densities (i.e., the coating of the middle plot was sputtered at a power of 2.2 kW/m, and middle one at 1.3 kW/m). Thus, it can be seen that films herein can be made more/less metallic by varying oxygen gas flow and/or voltage during the sputtering process, so that the degree of crystallinity can be taylored/adjusted. With regard to the coating for the top plot in FIG. 10, the big peaks in this plot indicate crystals and orientation of the same. For example, the first peak (at about 38 degrees) in the top plot indicates a [1 1 1] crystal orientation, the middle peak (at about 44 degrees) indicates a [1 0 0] crystal orientation, and the third peak (at about 64 degrees) indicates a [1 1 1] crystal orientation. This indicates nanocrystalline structure in the coating/film. Broad areas under peaks indicate nanocrystals (i.e., the bigger the crystals, the sharper the peaks). As will be appreciated by those skilled in the art, nanocrystals help improve hardness and thus mechanical durability of the film/coating.

It appears that nichromite is formed at subsurface levels in layer 7, and/or if present at the surface it has similar surface energies to NiO. In any event, the surface of layer 7 clearly includes nickel oxide (NiO) which is believed to heavily contribute to the UV stability of CA in layer 7. Scanning Tunneling Microscopy has indicated that the size of the nanocrystals in layer 7 (e.g., NiO (100) facets) at the surface thereof is from about 5–15 nm, more generally in the order of about 10 nm. Metallic Ni may also be present within grain boundaries.

Electron Energy Loss Spectroscopy (EELS) can be used to determine a band gap structure of a layer/material (especially if low energy electrons are used). FIG. 7 includes three EELS graphs, one for NiO, one for CoO, and one for MnO. The NiO graph in FIG. 7 shows the EELS spectrum of the surface of $NiCrO_x$ layer 7. The intensity of inelastically scattered electrons starts to rise sharply above about 4.5 eV and peaks at about 7 to 8 eV. The energy resolution is 100 meV. EELS thus provides an accurate picture of the surface electronic band structure and confirms that the surface of layer 7 includes a significant amount of NiO and that this material has a rather wide bandgap (4.5 eV<$E_{gap}$<7–8 eV). This wide bandgap may help provide UV stability; thus other materials (e.g., CoO and MnO) having similar bandgaps may be used in or as layer 7 in other embodiments of this invention. It has been found that tin oxide and titanium oxide, for example, having bandgap(s) of just below about 3.25 eV have been found to degrade upon UV exposure (minimum photon energy is 4.15 eV at 400 nm). Other ternary based oxides like ITO and AlZnO having bandgaps below 4 eV have also been found to degrade.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A coated article comprising:
   a layer comprising an oxide of NiCr and metallic Ni supported by a substrate,
   wherein said layer comprising the oxide of NiCr and metallic Ni has a contact angle θ of at least about 60 degrees after 100 hours of exposure to ultraviolet (UV) radiation, and
   wherein said layer comprising the oxide of NiCr and metallic Ni comprises nanocrystals.

2. The coated article of claim 1, wherein said layer comprising the oxide of NiCr has a contact angle θ of at least about 70 degrees after 100 hours of exposure to ultraviolet (UV) radiation.

3. The coated article of claim 2, wherein said layer comprising the oxide of NiCr has a contact angle θ of at least about 80 degrees after 100 hours of exposure to ultraviolet (UV) radiation.

4. The coated article of claim 1, wherein said layer comprising the oxide of NiCr comprises nickel oxide, chromium oxide, and said metallic nickel, and wherein the layer has more nickel oxide than metallic nickel.

5. A coated article comprising:
a layer comprising an oxide of NiCr and metallic Ni supported by a substrate,
wherein said layer comprising the oxide of NiCr and metallic Ni has a contact angle θ of at least about 60 degrees after 100 hours of exposure to ultraviolet (UV) radiation, and
wherein an outmost 20 Å thick portion of said layer comprising the oxide of NiCr and metallic Ni is at least 20% nickel oxide.

6. The coated article of claim 5, wherein said outmost 20 Å thick portion of said layer comprising the oxide of NiCr is at least 30% nickel oxide.

7. The coated article of claim 5, wherein said outmost 20 Å thick portion of said layer comprising the oxide of NiCr is at least 50% nickel oxide.

8. A coated article comprising:
a layer comprising an oxide of NiCr and metallic Ni supported by a substrate,
wherein said layer comprising the oxide of NiCr and metallic Ni has a contact angle θ of at least about 60 degrees after 100 hours of exposure to ultraviolet (UV) radiation, and
wherein the coated article has a visible transmission of at least about 70%.

9. The coated article of claim 8, wherein the contact angle θ of said layer does not drop by more than 15% due to said 100 hours of exposure to ultraviolet (UV) radiation.

10. A coated article comprising:
a layer comprising an oxide of NiCr and metallic Ni supported by a substrate,
wherein said layer comprising the oxide of NiCr and metallic Ni has a contact angle θ of at least about 60 degrees after 100 hours of exposure to ultraviolet (UV) radiation, and
wherein said layer comprising the oxide of NiCr and metallic Ni is from 10 to 200 angstroms (Å) thick.

11. The coated article of claim 1, further comprising at least one additional layer provided between said layer comprising the oxide of NiCr and said substrate.

12. A coated article comprising:
a layer comprising an oxide of NiCr and metallic Ni supported by a substrate,
wherein said layer comprising the oxide of NiCr and metallic Ni has a contact angle θ of at least about 60 degrees after 100 hours of exposure to ultraviolet (UV) radiation,
at least one additional layer provided between said layer comprising the oxide of NiCr and said substrate, and
wherein said substrate comprises glass, and wherein said one additional layer has an index of refraction value between the respective indices of refraction of said layer comprising the oxide of NiCr and said substrate.

13. A coated article comprising:
a layer comprising an oxide of NiCr supported by a glass substrate,
wherein said layer comprising the oxide of NiCr has an initial contact angle θ of at least about 70 degrees and comprises nanocrystals, and
wherein said layer comprising the oxide of NiCr includes nickel oxide, chromium oxide, and metallic nickel.

14. The coated article of claim 13, wherein the contact angle θ of said layer comprising the oxide of NiCr does not decrease by more than 15% upon exposure of the layer to UV radiation for 100 hours.

15. The coated article of claim 13, wherein said layer comprising the oxide of NiCr has an outmost 20 Å thickness portion furthest from said substrate, and wherein said outmost 20 Å thickness portion of said layer is at least 30% nickel oxide.

16. The coated article of claim 13, further comprising at least one additional layer provided between said layer comprising the oxide of NiCr and said glass substrate.

17. A coated article comprising:
a layer comprising an oxide of NiCr supported by a glass substrate,
wherein said layer comprising the oxide of NiCr has an initial contact angle θ of at least about 70 degrees, and comprises nanocrystal structure;
and wherein said layer comprising the oxide of NiCr includes nickel oxide, chromium oxide, and metallic nickel.

18. The coated article of claim 17, wherein the layer comprises NiO nanocrystallites.

19. The coated article of claim 17, wherein the nanocrystal structure includes nanocrystals having a size of from 5–15 nm.

* * * * *